(12) United States Patent
Chen

(10) Patent No.: US 7,983,279 B2
(45) Date of Patent: Jul. 19, 2011

(54) METHOD FOR CONFIGURING IP NETWORK RESOURCE AND IP NETWORK

(75) Inventor: Cheng Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 456 days.

(21) Appl. No.: 11/585,672

(22) Filed: Oct. 23, 2006

(65) Prior Publication Data

US 2007/0104092 A1 May 10, 2007

(30) Foreign Application Priority Data

Oct. 24, 2005 (CN) .......................... 2005 1 0114399

(51) Int. Cl.
*H04L 12/56* (2006.01)
(52) U.S. Cl. ......... 370/401; 370/389; 370/227; 370/218
(58) Field of Classification Search .................. 370/401, 370/227, 228
See application file for complete search history.

(56) References Cited

U.S. PATENT DOCUMENTS

| | | | |
|---|---|---|---|
| 6,456,597 B1 * | 9/2002 | Bare | 370/252 |
| 6,487,605 B1 * | 11/2002 | Leung | 709/245 |
| 6,839,829 B1 | 1/2005 | Daruwalla et al. | |
| 7,222,190 B2 * | 5/2007 | Klinker et al. | 709/238 |
| 2003/0189898 A1 * | 10/2003 | Frick et al. | 370/227 |
| 2003/0202473 A1 | 10/2003 | Patrick et al. | |
| 2004/0008694 A1 | 1/2004 | Guo | |
| 2007/0195701 A1 * | 8/2007 | Menth et al. | 370/238 |

FOREIGN PATENT DOCUMENTS

| | | |
|---|---|---|
| CN | 1466322 | 1/2004 |
| CN | 1533108 | 9/2004 |
| CN | 1585403 | 2/2005 |
| CN | 1592219 A | 3/2005 |
| CN | 1592294 A | 3/2005 |
| CN | 100401689 C | 7/2008 |

(Continued)

OTHER PUBLICATIONS

International Search Report for PCT/CN2006/001357, dated Oct. 26, 2006.

(Continued)

*Primary Examiner* — Dang T Ton
*Assistant Examiner* — Pamit Kaur
(74) *Attorney, Agent, or Firm* — Brinks Hofer Gilson & Lione

(57) ABSTRACT

A method for configuring IP network resource and an IP network are disclosed. The method includes: configuring a Plane A and a Plane B to have a reciprocal master-slave relation and to carry services individually, wherein the Planes A and B are connected with each other in a carrying network; configuring two interfaces of an access device with a reciprocal master-slave relation and assigning IP addresses to the Planes A and B respectively, to connect the Plane A with the Plane B; and distributing services to the IP addresses of the two interfaces in turn in the case that the IP address of a peer access device of the access device is unknown. The presently described technology can be easily implemented and can improve the network quality of service effectively, which can solve one or more problems in the conventional master-slave bi-planes networking, such as insufficient usage of the network resource, complex network policy configuration, etc.

13 Claims, 4 Drawing Sheets

FOREIGN PATENT DOCUMENTS

| | | |
|---|---|---|
| EP | 1 006 702 A2 | 6/2000 |
| EP | 1 176 765 A1 | 1/2002 |
| GB | 2426165 * | 11/2006 |
| WO | WO 02/32062 A1 | 4/2002 |

OTHER PUBLICATIONS

European Search Report for EP 06 12 2810.2, dated Jan. 8, 2007.

"Internet Protocol Darpa Internet Program Protocol Specification" Defense Advanced Research Projects Agency Information Processing Techniques Office. Sep. 1981.

Written Opinion of the International Searching Authority issued in corresponding PCT Application No. PCT/CN2006/001357; mailed Oct. 26, 2006.

* cited by examiner

METHOD FOR CONFIGURING IP NETWORK RESOURCE AND IP NETWORK

RELATED APPLICATIONS

This patent application makes reference to, claims priority to and claims benefit from Chinese Patent Application No. 200510114399.7 filed on Oct. 24, 2005, which is explicitly incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention relates to network communication techniques, and more particularly to a method for configuring Internet Protocol (IP) network resource and an IP network.

In a conventional IP network, a typical networking of the access device and the IP carrying network is configured such that an access device, such as a personal computer (PC), is connected to the IP network by Ethernet or other access technologies. If the connection between the access device and the IP network breaks, the service will be interrupted. The IP network may ensure the reliability by network redundancy and dynamic router protocol.

In a network such as a Next Generation Network (NGN) or WCDMA/CDMA, a general networking of the access device and the IP carrying network is exemplarily depicted in FIG. 1, where the access device may be a communication device depending on the IP network, such as a media gateway, a soft switch, etc., in the NGN or the mobile WCDMA/CDMA. In order to succeed and conform to the high reliability as that in the conventional PSTN (Public Switch Telephone Network), the access device generally has a master and a slave interfaces for connecting the access device to edge routers in the IP network through a master/slave link. The master/slave link can be Ethernet, POS (Packet Over SONET/SDH), etc.

Since the NGN service requires high quality of service (QoS) from the IP carrying network, for example, a packet loss <1%, a network jitter <20 ms, a timing delay <100 ms, and high reliability, for example, time for recovering signal point of failure <50 ms, the conventional IP network is unable to satisfy these requirements. Therefore, a dedicated IP network with high QoS and high reliability is desired for carrying the NGN service.

In order to solve QoS and reliability problem, the conventional techniques constitute the networking by adopting a Plane A/B networking. As shown in FIG. 2, the access device, such as a media gateway, is connected to two routers or L3 (layer 3 Ethernet switch) in the IP carrying network through a master and a slave interfaces respectively.

These two access routers or L3 belong to different planes respectively. Planes A and B can be two logical channels being backup of each other, such as MPLS VPN, or two physical networks with strict layout and be backup of each other.

Generally, an access device just distributes services at the IP address of a master interface. When the service messages are transmitted to the router from an access device, the router selects one plane to transmit the messages to a peer access device. Particularly, a carrying plane A/B selected by one edge router at two peers should be the same one. Otherwise, if the edge router selects Plane A for one peer, but selects Plane B for the other peer, it will be required for Plane A/B to forward messages between each other.

When the master interface of the access device fails, the master and slave relation between the interfaces will be switched, so that messages can be transmitted to the router through the slave interface and can be received through the slave interface.

When the routers or the links in the Plane A/B fail, the service can be recovered by convergence and fast switch.

BRIEF SUMMARY OF THE INVENTION

In one aspect, the presently described technology provides a method for configuring IP network resource. The method can include the following steps: configuring a Plane A and a Plane B to have a reciprocal master-slave relation and to carry service individually, said Plane A and Plane B connected with each other in a carrying network; configuring two interfaces of an access device to have a reciprocal master-slave relation and assigning IP addresses associated with the Plane A or the Plane B to the two interfaces respectively, for connecting the two interfaces with the Plane A or the Plane B; and distributing services to the IP addresses of the two interfaces in turn in the case that the IP address of a peer access device of said access device is unknown.

According to one embodiment, the above method can further include distributing services averagely to the IP addresses of the two interfaces of the access device in turn in the case that the IP address of a peer access device of the access device is unknown.

According to another embodiment, the above method can further include distributing services to an IP address associated with the same home plane with the IP address of the peer access device priorly in the case that the IP address of the peer access device is known.

According to still another embodiment, the above method further includes distributing services to the IP address of a respective slave interface of a previously selected interface, in the case that the IP address of the peer access device is known and the services distributed to an IP address associated with a same home plane with the IP address of the access device exceed a set bandwidth.

If one interface of the access device is failed, the above method can further include changing router information and transferring the services to a slave interface of the failed interface for transmitting and receiving services.

In the above method, the Plane A and the Plane B preferably can be distinguished by network segments.

In one embodiment, the interfaces of the access device can be configured to have the reciprocal master-slave relation by explicit configuration.

In another embodiment, the interfaces of the access device can be configured to have the reciprocal master-slave relation by router priority.

In another aspect, the presently described technology provides an IP network that includes at least one access device and an IP carrying network with a plane A and a plane B. The Plane A and the Plane B are configured to connect with each other, carry services individually and have a reciprocal master-slave relation. Each access device preferably includes two interfaces with a reciprocal master-slave relation. The two interfaces of one such access device are connected to the Planes A and B through IP addresses associated with the Planes A and B respectively, and two IP addresses of the two interfaces of the access device configured for carrying services commonly in a case that the IP address of a peer access device of the access device is unknown.

The IP addresses of the two interfaces of the access device can be configured for carrying services averagely in the case that the IP address of a peer access device of the access device is unknown.

If one interface of the access device is failed, another interface having the reciprocal master-slave relation with the one interface can be configured for transmitting and receiving the services of the one interface.

In the case that the IP address of the peer access device is known, an IP address associated with the same home plane with the IP address of the peer access device can be configured to have a higher priority than the other of the two IP addresses of the interfaces.

As described in the above technical solution, the presently described technology provides interfaces with load-shared and reciprocal master-slave relation. The two interfaces of the access device can be connected to Plane A or B of the IP carrying network respectively at the same time. When the IP address of the peer device is unknown, it can distribute services averagely to the respective interfaces associated with the two planes. Otherwise, when the IP address of the peer device is known, through the plane with the peer IP address, services can be distributed priorly to the IP address belonging to the same plane with the IP address of the peer device. Thereby, the presently described technology can be implemented easily and can improve the network QoS effectively, which can solve one or more of the problems existing in the conventional master-slave bi-planes networking, such as insufficient usage of the network resource, complex network policy configuration, etc.

DETAILED DESCRIPTION OF THE INVENTION

The presently described technology provides a network resource configuration method with networking designs of load-shared and reciprocal master-slave bi-planes, which may solve the problems in the conventional master-slave bi-planes networking, such as insufficient usage of the network resource and complex network policy configuration etc.

Figure 1:
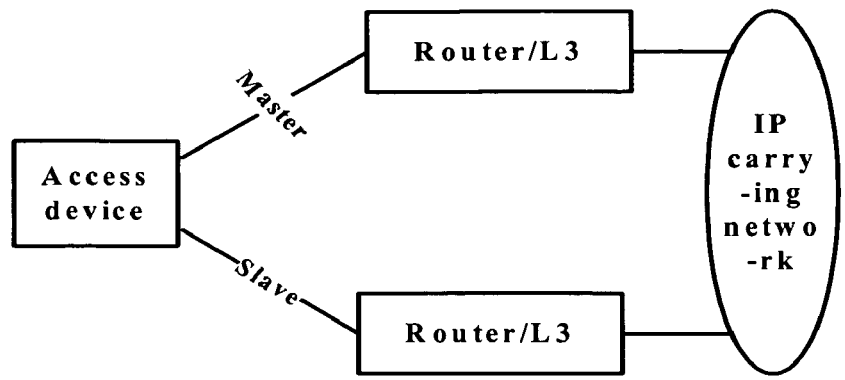
FIG. 1 is a schematic diagram showing a conventional NGN networking configuration.
Figure 2:
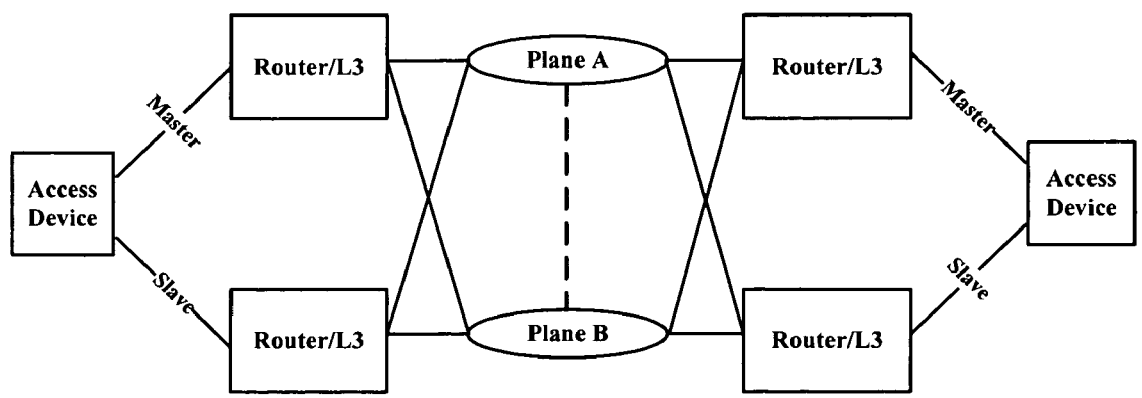
FIG. 2 is a schematic diagram showing a conventional NGN networking configuration with Planes A/B.
Figure 3:
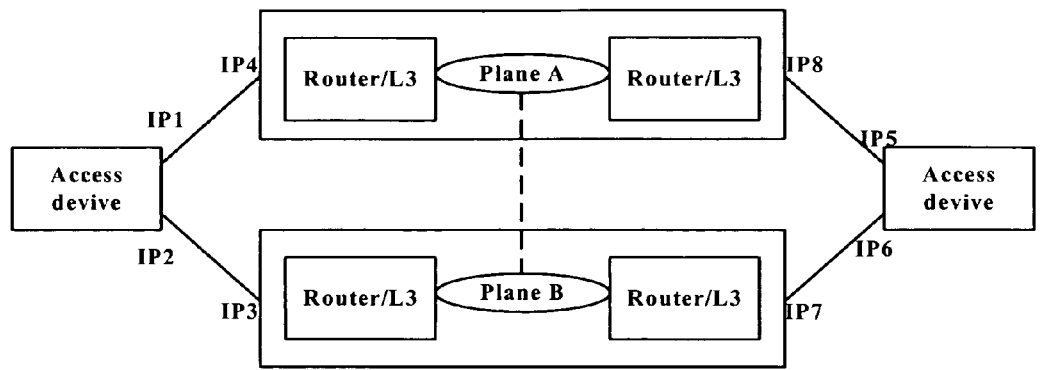
FIG. 3 is a schematic diagram showing a networking configuration according to an embodiment of the presently described technology.

As depicted in FIG. 3, an IP networking in accordance with one embodiment of the presently described technology includes an access device, a first IP carrying subsystem and a second IP carrying subsystem.

In particular, the first IP carrying subsystem includes a Plane A and a couple of Router/L3 connected to each other through the Plane A. The second IP carrying subsystem includes a Plane B and a couple of Router/L3 connected to each other through the Plane B. Further, the first and the second IP carrying subsystems are connected with each other through the Planes A and B.

The Plane A and the Plane B are connected with each other, both conform to QoS layout, can carry services independently and can be backup for each other.

The access device connects to the Plane A and the Plane B through interfaces with reciprocal master-slave relation, i.e., IP1 and IP2, IP 5 and IP 6, respectively. Here, IP1 and IP2 can be a slave or master IP for each other, while IP5 and IP6 can be a slave or master IP for each other.

Figure 6:
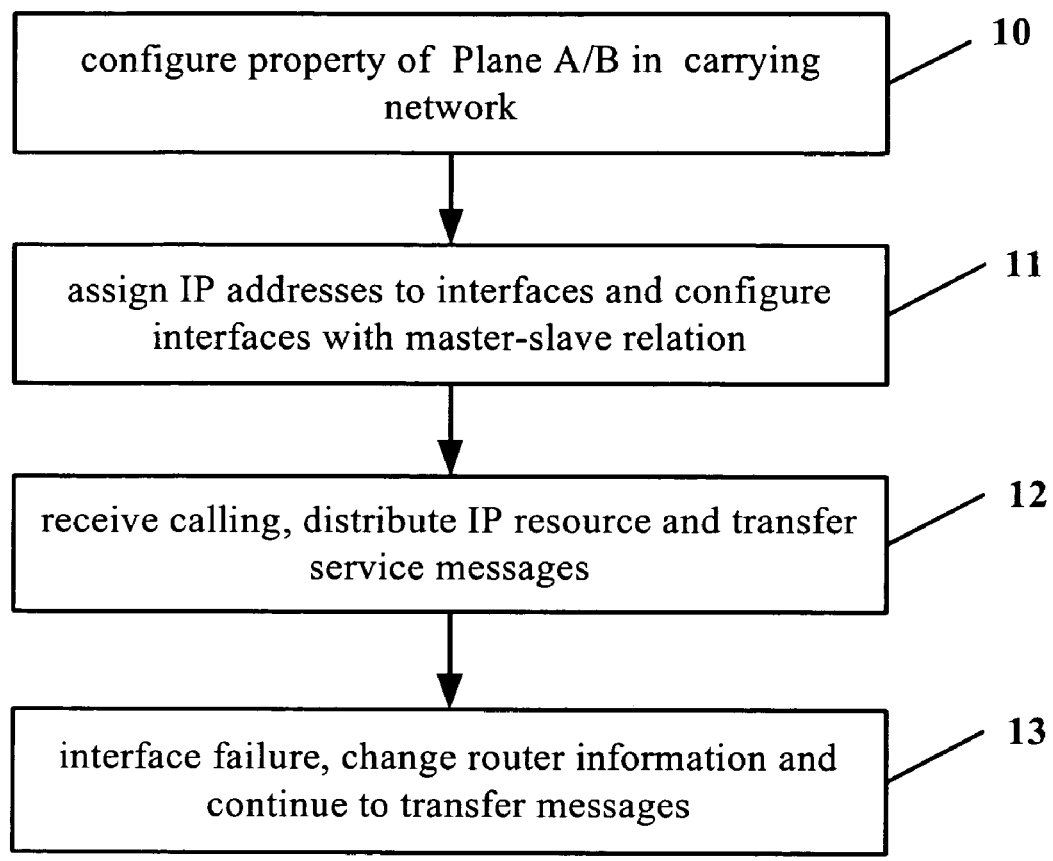
FIG. 6 is a flowchart showing the method according to the embodiments of the presently described technology.

The network resource configuration method according to an embodiment of the presently described technology is implemented based on the above IP network architecture. The present method is applicable in all networking applications of IP network. Below, the embodiment will be described by using an example of application in an NGN network, where an NGN TG (Trunk Gateway) is used as the access device. The method depicted in FIG. 6 includes the following steps.

At step 10, properties of the Plane A/B of the carrying network with a reciprocal master-slave relation are configured.

FIG. 3 shows a networking configuration of the NGN network according to an embodiment of the presently described technology. Each plane should confirm to the QoS layout strictly to meet the requirement of the NGN service. The property of the Plane A/B is configured that each plane carries service independently and the planes have a reciprocal master-slave relation, whereby, when distributing IP resource in the present access device, it can select an IP address for the present access device according to the home plane of the IP address of the peer device, so as to make the messages to be transferred between the two communication devices through a single plane. Besides that, during transfer of the service messages, preferably, it should primarily transfer in the same plane or between two planes as well.

Planes A/B can be distinguished by network segments. For example, an address of network segments larger than 10.0.0.0 may be set as the address of the Plane A, and an address of network segments less than 10.0.0.0 may be set as the address of the Plane B. Alternatively, complex combinations of several conditions can be set, such as an address in the range of 10.0.0.0 to 11.0.0.0 or a range less then 2.0.0.0 can be set for Plane A, and others for Plane B.

At step 11, IP addresses are assigned to the interfaces and the interfaces with a reciprocal master-slave relation are configured.

The IP addresses assigned to the interfaces are used for distributing services. The two interfaces are assigned with different IP addresses to make them belong to different planes respectively, so as to achieve the purpose of service load share. Further, a bandwidth for distributing service is specified for each IP address. An exemplary configuration is as follows:

address of interface 1 IP1: 10.1.1.1, Plane A, service bandwidth 500M;

address of interface 2 IP2: 9.1.1.1, Plane B, service bandwidth 500M.

Of course, the interface 1 can be specified with a server bandwidth 400M and the interface 2 can be specified with a server bandwidth 600M in actual situation. In the embodiments of the presently described technology, only the situation that the two interfaces are specified with the same service bandwidth is described in detail.

One can be indicated which two interfaces have the reciprocal master-slave relation by explicit configuration or router priority. When any one of the two interfaces with the reciprocal master-slave relation fails, services at the failed interface will be received and transmitted through the corresponding backup interface. The bandwidths specified for the two interfaces with a reciprocal master-slave relation cannot be larger than that of a physical interface. Otherwise, parts of the services will be interrupted when the failure occurs.

For example, it can be configured as follows:

IP2 as slave of IP1: master interface IP1, slave interface IP2;

IP1 as slave of IP2, master interface IP2, slave interface IP1.

The access device can be connected to edge nodes of the Planes A and B through the two interfaces with reciprocal master-slave relation respectively. Both Plane A and Plane B can receive and transfer the service messages through any interface of the access device.

At step 12, the access device receives calling, distributes IP resource and transfers service messages.

After completing the above configuration, when the access device receives calling requesting for IP resource distribution, if the IP address of the peer device is unknown, services can be distributed averagely to the two interfaces with reciprocal master-slave relation in turn. If the access device is a calling side of the NGN TG, the services can be distributed to the interfaces at, for example, address 10.1.1.1 and address 9.1.1.1 in turn, as shown in FIG. 4.

If the IP address of the peer device is known, an IP address can be assigned to the present access device according to the property of the home plane of the IP address assigned for the peer device. If the services distributed at the assigned IP address exceed the set bandwidth, another IP address can be selected as backup of the IP address for distributing the services. When the access device is a called side of the NGN TG, if the peer device is assigned with, for example, an IP address of Plane A 10.1.1.1, the present access device can distribute services at IP address 10.1.1.2 of plane A priorly.

Figure 4:
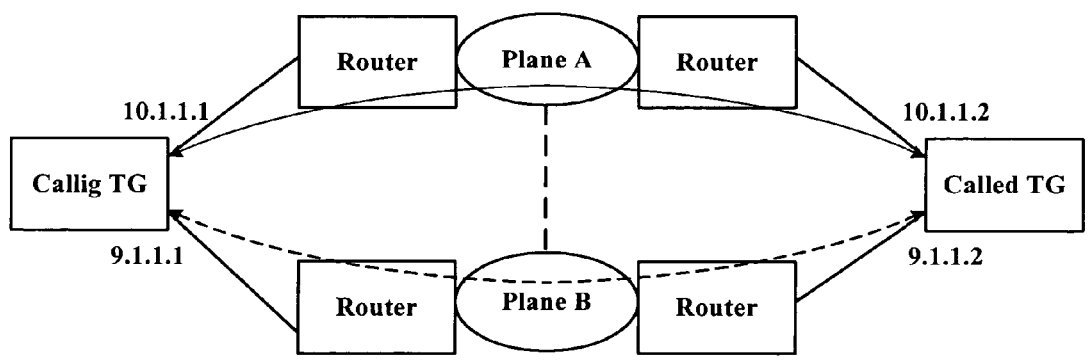
FIG. 4 is a schematic diagram showing an operation state of a method according to an embodiment of the presently described technology.

As shown in FIG. 4, the calling side TG distributes services at IP address 10.1.1.1 according to the alternative principle, and the called side TG selects the IP address 10.1.1.2 which belongs to the same plane as the calling side TG for distributing services.

The communication between addresses 10.1.1.1 and 10.1.1.2 is only conducted through the Plane A in this example.

The communication between addresses 9.1.1.1 and 9.1.1.2 is only conducted through the Plane B in this example.

After the IP address of the present access device is assigned, the service messages can be transferred through the interface with the assigned IP address by the router. The service messages of the calling and the called side can be transferred through the same plane.

At step 13, when one interface fails, the method can change the router information and continue to transfer the service messages.

In accordance with one embodiment of the present technology, when one interface, such as the interface with IP1, fails, it is only necessary to change the router information, and transmit the service messages with original address IP1 through the interface with address IP2 as the respective backup of the interface with address IP1. Similarly, the messages with destination address IP1 can be received through the interface with address IP2.

Since the service can be recovered by simply changing the router, the process is very simple, and a break time for the service due to failure can be less than 50 ms. Similarly, the peer router can be processed as above.

If the interface with address IP2 fails but the interface with address IP1 is normal, the processing can be the same or similar.

Figure 5:
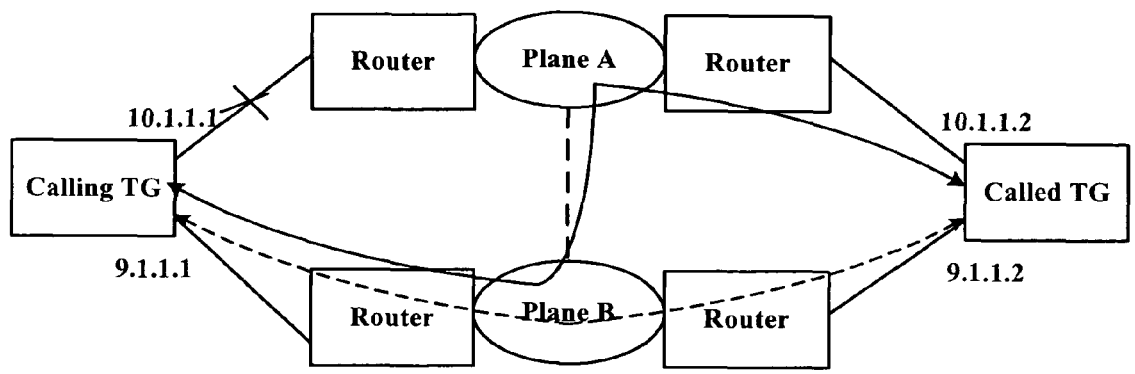
FIG. 5 is a schematic diagram showing another operation state of the method according to another embodiment of the presently described technology.

As shown in FIG. 5, if the interface with the address 10.1.1.1 fails, messages with IP address 10.1.1.1 can be transmitted and received through the physical interface with address 9.1.1.1, whereby the service will not be interrupted and a failure recovery time of the interface with address 10.1.1.1 can be less than 50 ms.

New services are distributed through the interface with address 9.1.1.1, so that the interface with address 10.1.1.1 can be maintained after its service is offline. Further, after the failure recovers, it automatically recovers the normal communication.

Accordingly, the presently described technology provides interfaces with load-shared and reciprocal master-slave relation. The two interfaces of the access device can be connected to Planes A and B of the IP carrying network respectively at the same time. When the IP address of the peer device is unknown, it can distribute services averagely to the respective interfaces associated with the two planes. Otherwise, when the IP address of the peer device is known, through the plane with the peer IP address, services can be distributed to the IP address in the same plane with the IP address of the peer device in priority.

Although illustrative embodiments have been described herein with reference to the accompanying drawings, it should be understood by those skilled in the art that the presently described technology is not limited to those preferred embodiments, and that various changes and modifications can be made therein without departing from the spirit and the scope of the invention. Thus, it is intended that the presently described technology covers the modifications and variations of this invention provided they come within the scope of the appended claims and their equivalents.

What is claimed is:

1. A method for configuring IP network resource, comprising:

configuring a Plane A and a Plane B to have a reciprocal master-slave relation and to carry service regardless of the state of the Plane A and the Plane B, wherein the Plane A and the Plane B are connected with each other in a carrying network;

configuring two interfaces of an access device to have the reciprocal master-slave relation and assigning a first IP address and a second IP address associated with the Plane A and the Plane B to the two interfaces respectively, for connecting the two interfaces with the Plane A or the Plane B, wherein a first bandwidth and a second bandwidth are specified for the first IP address and the second IP address, respectively;

distributing services to the first IP address and the second IP address of the two interfaces in turn if an IP address of a peer access device of the access device is unknown;

if the IP address of the peer access device is known, distributing the services to the first IP address if a bandwidth of the services distributed to the first IP address does not exceed the first bandwidth, and distributing the services to the second IP address if the bandwidth of the services distributed to the first IP address exceeds the first bandwidth, and wherein both the first IP address and the IP address of the peer access device are associated with the Plane A.

2. The method according to claim 1, further comprising: distributing services averagely to the IP addresses of the two interfaces of the access device in turn in the case that the IP address of the peer access device of said access device is unknown.

3. The method according to claim 1, further comprising: if one interface of the access device is failed, changing router information and transferring the services to a slave interface of the failed interface for transmitting and receiving services.

4. The method according to claim 2, further comprising: if one interface of the access device is failed, changing router information and transferring the services to a slave interface of the failed interface for transmitting and receiving services.

5. The method according to claim 1, wherein the Plane A and the Plane B are distinguished by network segments.

6. The method according to claim 2, wherein the Plane A and the Plane B are distinguished by network segments.

7. The method according to claim 1, wherein the interfaces of the access device are configured to have the reciprocal master-slave relation by explicit configuration.

8. The method according to claim 2, wherein the interfaces of the access device are configured to have the reciprocal master-slave relation by explicit configuration.

9. The method according to claim 1, wherein the interfaces of the access device are configured to have the reciprocal master-slave relation by router priority.

10. The method according to claim 2, wherein the interfaces of the access device are configured to have the reciprocal master-slave relation by router priority.

11. A communication network comprising:
an access device and an IP carrying network with a plane A and a plane B, wherein the Plane A and the Plane B are configured to connect with each other, carry services regardless of the state of the Plane A and the Plane B, and have a reciprocal master-slave relation;
wherein the access device comprises two interfaces with the reciprocal master-slave relation, and the two interfaces are connected to the Plane A and Plane B through a first IP address and a second IP address associated with the Planes A and B respectively, a first bandwidth and a second bandwidth are specified for the first IP address and the second IP address respectively;
wherein the first IP address and the second IP address of the two interfaces of the access device are configured for carrying services in turn if an IP address of a peer access device of the access device is unknown;
wherein if the IP address of the peer access device is known, the services are distributed to the first IP address if a bandwidth of the services distributed to the first IP address do not exceed the first bandwidth, and the services are distributed to the second IP address if the bandwidth of the services distributed to the first IP address exceeds the first bandwidth, and
wherein both the first IP address and the IP address of the peer access device are associated with the Plane A.

12. The communication network according to claim 11, wherein the IP addresses of the two interfaces of said access device are configured for carrying services averagely in the case that the IP address of the peer access device of said access device is unknown.

13. The communication network according to claim 11, wherein if one interface of the access device is failed, another interface having the second reciprocal master-slave relation with said one interface is configured for transmitting and receiving the services in connection with said one interface.

* * * * *